B. J. LINDGREN.
AUTOMATIC CLUTCH CONTROL FOR POWER PRESSES.
APPLICATION FILED APR. 10, 1918.
1,342,965.
Patented June 8, 1920.
3 SHEETS—SHEET 1.
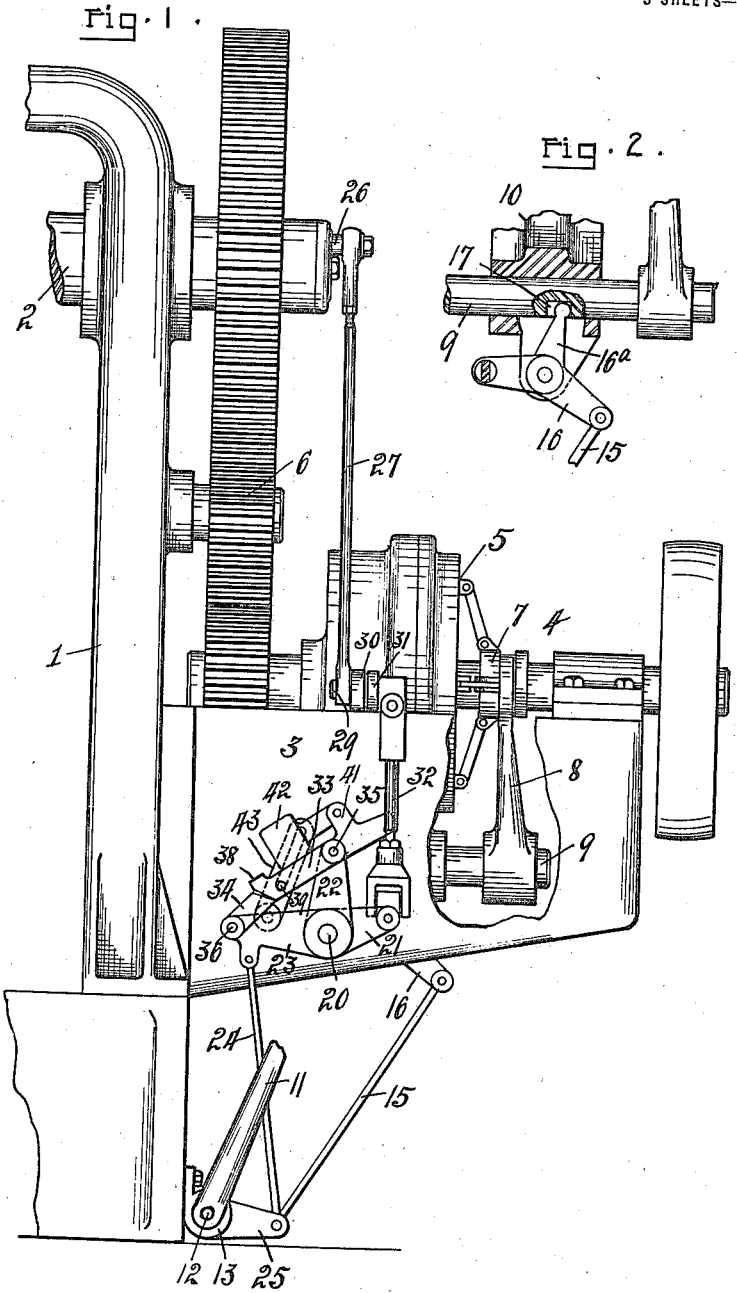
INVENTOR·
Bror J. Lindgren,
By Owen, Owen & Crampton.
His attys

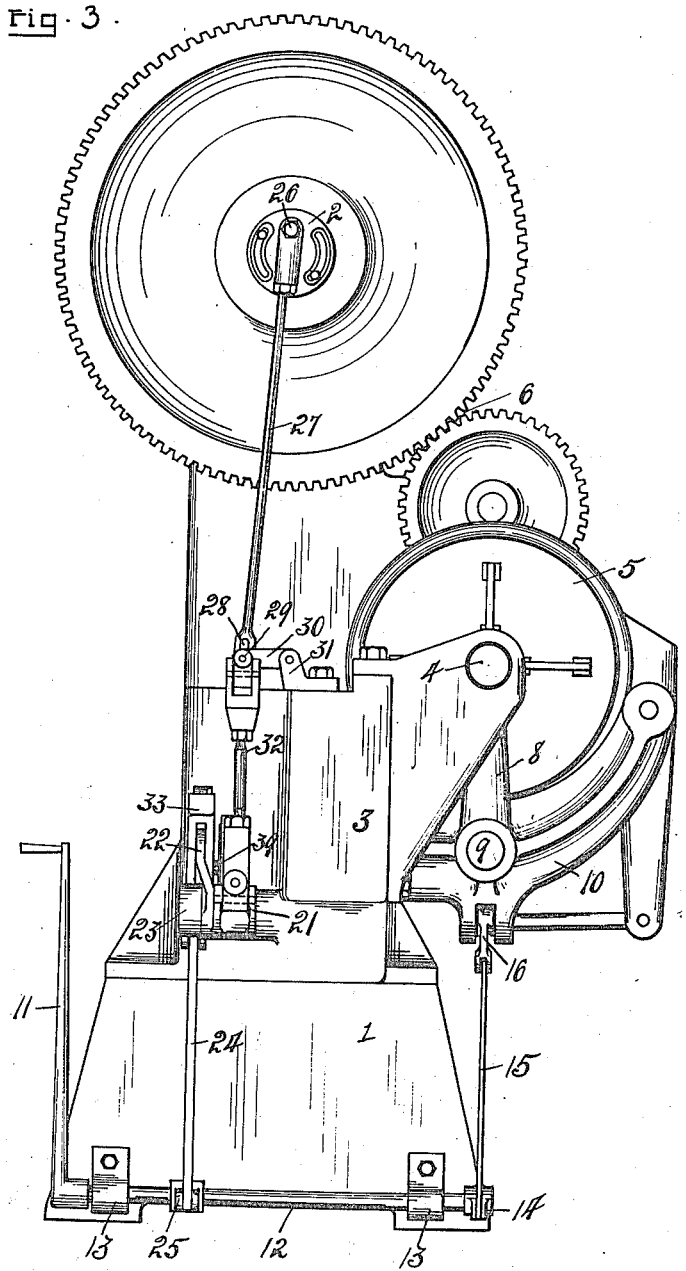

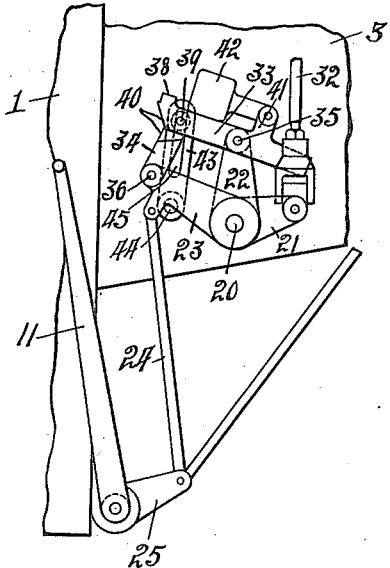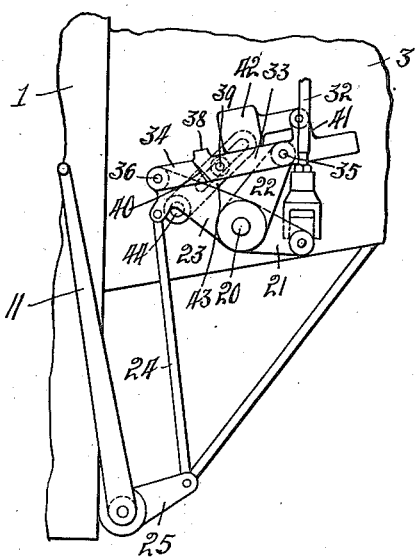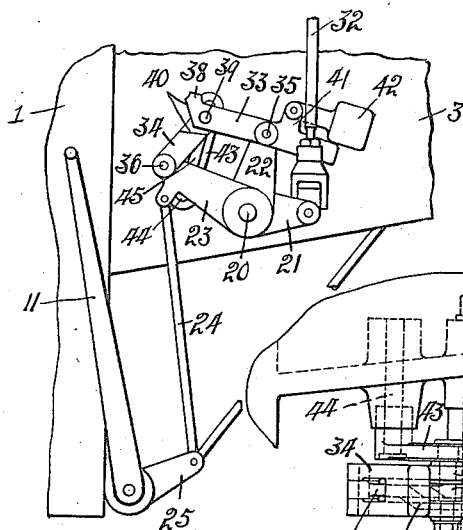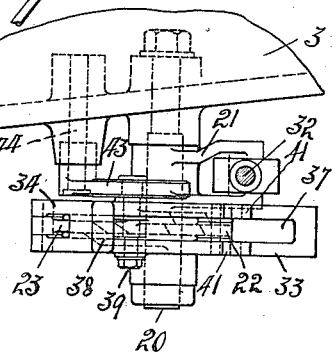

UNITED STATES PATENT OFFICE.

BROR J. LINDGREN, OF TOLEDO, OHIO, ASSIGNOR TO THE TOLEDO MACHINE & TOOL COMPANY, OF TOLEDO, OHIO, A CORPORATION OF OHIO.

AUTOMATIC CLUTCH CONTROL FOR POWER-PRESSES.

1,342,965.  Specification of Letters Patent.  Patented June 8, 1920.

Application filed April 10, 1918. Serial No. 227,637.

*To all whom it may concern:*

Be it known that I, BROR J. LINDGREN, a citizen of the United States, and resident of Toledo, in the county of Lucas and State of Ohio, have invented a certain new and useful Automatic Clutch Control for Power-Presses; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to clutch-control means, and particularly to means of this class intended for use in connection with the hand-operated clutch control means of power-presses or the like, and which is capable of being automatically operated to release the drive-clutch of the press at or adjacent to the end of each cycle, or of being rendered inoperative at will with respect to the clutch-control means, whereby the press may run until stopped by a manual throwing-out of the clutch.

The object of my invention is the provision of an improved automatically operating clutch-control mechanism of the class described, which is connected to the manually operated clutch-control means, is simple and efficient in its construction, is positive in its clutch throwing-out operation, and is capable of being easily and quickly rendered inoperative, whereby the shifting of the clutch is controlled alone through the manually controlled means. Further objects and advantages of the invention will be apparent from the following detailed description thereof.

While the invention, in its broader aspect, is capable of embodiment in numerous forms, a preferred embodiment thereof is illustrated in the accompanying drawings, in which—

Figure 1 is a fragmentary front elevation of a power-press, with the mechanism embodying the invention in operative connection therewith and in clutch thrown-out position. Fig. 2 is a fragmentary detail of a portion of the clutch throwing-out means. Fig. 3 is a side elevation of the press shown in Fig. 1 and the clutch operating mechanism. Fig. 4 is a detail of the automatic clutch throwing-out mechanism in the position which it assumes when the control-lever is thrown to operating position and when the press mechanism is at the beginning of a cycle of operations. Fig. 5 is a similar detail of the automatic clutch throwing-out mechanism in the operative position which it assumes when the operating crank is at the lower end of its stroke. Fig. 6 is a similar detail with the automatic control mechanism inoperative and in the position which it assumes when the operating crank is substantially midway between the limits of the down stroke thereof, and Fig. 7 is a top plan view of the automatic clutch-control mechanism embodying the invention in the position shown in Fig. 5 and with a part removed.

Referring to the drawings, 1 designates the frame of a power-press, 2 the customary crank or operating shaft, which, in the present instance, is mounted in the top portion of said frame, 3 a bracket projecting from one side of the frame, 4 a power-shaft journaled in said bracket and having a clutch 5 in driving connection with the shaft 2, in the present instance, through a train of gears 6. The engaging and releasing movements of the clutch illustrated are effected by the shifting of a collar 7 on the shaft 4, as is well understood in the art, and the movements of this collar are controlled by a shipper-arm 8, which projects from a shaft 9, that is mounted for axial movements in a bearing-arm 10 of the bracket 3.

The hand-control lever 11 for the clutch is mounted on a rock-shaft 12 in convenient reach of the operator, said shaft being journaled in bearings 13 at the side of the frame 1 below the bracket 3 and has a rock-arm 14 connected by a link 15 to one arm of a bell-crank lever 16, which is mounted in the bearing-arm 10 below the shaft 9 with its axis transverse thereto. The arm 16ª of the lever 16 extends upward and engages in a recess 17 in the shaft 9, whereby a rocking of said lever imparts axial clutch operating movements to said shaft. The connection between the control-lever 11 and the shipper-shaft 9, in the present instance, is such that a movement of the control-lever to the left, or to the position shown in Figs. 4 to 6, effects an engagement of the clutch members, while a movement of the lever to the right, to the position shown in Fig. 1, effects a disengagement of the clutch member.

Nothing new is claimed for the mechanism above described, as it is common in one form or another in power-presses, and such mechanism or the type of machine to which applied may vary materially without affecting the invention, which will now be described.

A pivot-stud 20 projects horizontally, in the present instance, from the front side of the bracket 3 and has rocker-arms 21, 22 and 23 mounted for rocking movements thereon, the arms 21 and 22 being disposed at substantially a right angle one to the other, with the arm 21 projecting to the right and the arm 22 projecting upward and rigidly connected to coöperate to form a bell-crank lever. The arm 23 projects to the left of the pivot-stud 20 for rocking movements relative to the arms 21 and 22 and is connected near its outer end by a link 24 to a rocker-arm 25 projecting to the right from the rock-shaft 12. The rocker-arm 21 has connection with a crank-pin 26 on the adjacent end of the operating shaft 2, whereby a rotation of said shaft imparts predetermined rocking movements to said arm. Such connection, in the present instance, comprises a connecting rod 27, which is pivoted at its upper end to the wrist or crank-pin 26 and has its lower end provided with a longitudinally extending slot 28 in which a pin 29, that projects from a guide-link 30, works. The guide-link 30 is pivoted to a bearing-arm 31 on the top of the bracket 3 for horizontal rocking movements. The link 30 has universal joint connection with a connecting rod 32, which extends downward from the outer end of said link and has universal joint connection at its lower end with the free end of the rocker-arm 21.

The free ends of the rocker-arms 22 and 23 are connected by a toggle having the link members 33 and 34, the former of which is pivoted intermediate its ends, as at 35, to the arm 22, while the latter of said links is pivoted, as at 36, to the arm 23. The toggle member 33 is in the form of a yoke having a longitudinally extending opening 37 therein, in which opening the rocker-arm 22 projects, and the inner end of said member is open, except for a top connecting strip 38, to permit the members 33 and 34 to stand in longitudinal alinement with the inner end of the latter entering the inner end of the former and pivotally connected thereto by a pivot 39. The toggle member 34 has its outer end forked to adapt it to straddle the arm 23 to which pivoted. The inner ends of the toggle members are provided with shoulders 40, which coact to prevent a downward breaking movement of the toggle-link from straight position but do not interfere with an upward breaking movement thereof from straight position, as illustrated in the drawings. The toggle member 33 has ears 41 projecting upward from its opposite sides, preferably at the outer side of the pivot 35, and a weight 42 has its carrying arm pivoted to said ears between the same for swinging movements lengthwise of the toggle member. It is evident that when the weight 41 is swung adjacent to the inner end of the toggle member 33, as shown in Figs. 1, 4 and 5, it will exert a downward straightening pressure on the toggle-links and that when it is thrown to the outer end of the toggle member 33, as shown in Fig. 6, it will exert a breaking stress on the toggle members.

A rocker-arm 43 is pivoted at its lower end for vertical rocking movements to a stud 44 projecting from the bracket 3 at the left of the pivot-stud 20, and this rocker-arm has a longitudinally extending slot 45 in its swinging end portion in which the rear end of the pivot-pin 39, connecting the inner ends of the toggle members 33 and 34, is mounted for transverse reciprocatory movements. The slot 45 is of sufficient length to permit the desired upward breaking movement of the toggle members and has its lower end terminating in position to coact with the pivot-pin 39 and prevent a complete straightening of the toggle members when the clutch throwing mechanism is in at-rest position, with the control-lever 11 in its inoperative position, as shown in Fig. 1. This enables a throwing of the control-lever 11 to the left or to its operative position, to raise the rocker-arm 23 and break the toggle connection without imparting movement to the lever-arms 21 and 22.

In the use of my invention the operator, if he desires to effect an automatic stopping of the press at the end of each cycle, places the weight 42 at the left of the supporting pivot 35 of the toggle member 33 so that the tendency of the toggle is to remain in straightened-out position. In starting the operation of the press it is only necessary for him to throw the control-lever 11 to the left from the position shown in Fig. 1 to that shown in Fig. 4, thereby throwing the clutch 5 into engagement to effect a driving of the shaft 2 and at the same time raising the rocker-arm 23 of the automatic stop mechanism to the position shown in Fig. 4, which movement of the rocker arm breaks the toggle connection 33, 34 so that no movement is imparted to the lever-arms 21 and 22. The wrist-pin 26 on the end of the shaft 2 now starts its downward stroke and when it has moved a sufficient distance to compensate for the length of the slot 28 in the connecting rod 27 the connection 32 will then be moved downward therewith and effect a movement of the lever arms 21, 22 to the position shown in Fig. 5, which movement is sufficient to straighten out the toggle members 33, 34. On the next stroke of the wrist-pin the lever-arms 21 and 22, the rocker-arm 23 and the toggle members 33 and 34 are swung as a unit about the pivot-pin 20 and cause a throwing of the control-lever 11 to its inoperative position and a consequent release of the clutch 5, the shaft 2 then stopping at the end of a single rotation thereof. When the automatic release mechanism is near the limit of its swinging movement to the left the pivot-pin 39, which connects the inner ends of the toggle members, will have engaged the lower end of the slot in the rocker-arm 43 so that a slight breaking of the alinement of said members will be effected by the remaining movement of the mechanism, as shown in Fig. 1, thereby leaving the toggle members in position to be broken by an upward movement of the rocker-arm 23. If it is desired to have the press run continuously, upon a throwing of the control-lever 11 to operative position, the weight 42 is swung to the outer end of the toggle member 33, thereby exerting a breaking force on the toggle members so that the lever-arms 21 and 22 will be permitted to have free backward and forward movements with the connection 32 without imparting a control-lever shifting movement to the rocker-arm 23.

It is evident that I have provided a simple mechanism which is capable of operating idly without effecting a release of the clutch at or adjacent to the end of each cycle of operations, or of being adjusted in an easy and rapid manner to render it operative, whereby it is instrumental in stopping an operation of the press at the end of each cycle.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is—

1. In combination, a drive member, a rotatable driven member, clutch controlled driving connection between said members, control means manually operable to engage and release the clutch of said connection, a plurality of rocker members, connection between one of said rocker members and said means, connection between the other of said rocker members and said driven member whereby a rocking movement is imparted to said rocker member from a rotation of said driven member, and connection between said rocking members operable to communicate movement from one to the other thereof and to cause a movement of said control means from operative to inoperative position.

2. In combination, a drive member, a rotatable driven member, clutch controlled driving connection between said members, means manually operable to control the clutch releasing and engaging movements of said connection, a plurality of rocker arms, connection between one of said arms and said means, connection between another of said arms and said driven member to communicate rocking movements to one from a rotation of the other, and a toggle connection between said arms operable to communicate predetermined movements from one to the other of said arms to shift said controlling means from operative to inoperative position during a predetermined portion of a rotation of said driven member.

3. In combination, rotatable drive and driven members, a clutch controlled driving connection between said members, control means manually operable to engage and release the clutch of said connection, a rocker-arm connected to and movable in unison with said means, a lever mounted for rocking movements relative to said arm, means for communicating a rocking movement to said lever from a rotation of said driven member, and a toggle connection between said lever and arm operable to cause said lever and arm to have predetermined movements in unison and to shift said control means from operative to inoperative position during a predetermined portion of a rotation of said driven member.

4. In combination, rotatable drive and driven members, a clutch controlled driving connection between said members, control means manually operable to engage and release the clutch of said connection, two rocker elements mounted for relative rocking movements, means for imparting rocking movements to one of said elements from a rotation of said driven member, means connecting the other of said elements to said control means to move it in unison therewith, means connecting said elements and operable to permit a relative movement of said elements when said control means is moved from inoperative to operative position and operable to cause said elements to move in unison and to shift said control means from operative to inoperative position during a predetermined portion of a rotation of said driven member.

5. In combination, rotatable drive and driven members, a clutch controlled driving connection between said members, control means manually operable to engage and release the clutch of said connection, and mechanism connecting said driven member and control means, said mechanism including a toggle which breaks during a shifting of said means from inoperative to operative position and which straightens and then acts as a motion communicating element to shift said means from operative to inoperative position when the element is moved by said driven member and during a predetermined portion of the rotation of the driven member.

6. In combination, rotatable drive and driven members, a clutch controlled driving connection between said members, control means manually operable to engage and release the clutch of said connection, an element connected to and movable with said means, a second element, connection between said second element and driven member for imparting rocking movements to one from a rotation of the other, and a connection between said elements operable to permit relative movements of said elements when said control means is moved from inoperative to operative position and operable to impart movements from one to the other of said elements to return the control means to inoperative position during a predetermined portion of a rotation of said driven member.

7. In combination, rotatable drive and driven members, a clutch controlled driving connection between said members, control means manually operable to engage and release the clutch of said connection, an element connected to and movable with said means, a second element, connection between said second element and driven member for imparting rocking movements to one from a rotation of the other, a connection between said elements operable to permit relative movements of said elements when said control means is moved from inoperative to operative position and operable to impart movements from one to the other of said elements to return the control means to inoperative position during a predetermined portion of a rotation of said driven member, and means operable to render said last connection inoperative to impart movements from one to the other of said elements and vice versa.

8. In combination, rotatable drive and driven members, clutch controlled driving connection between said members, manually operable control means for the clutch of said connection, a rocker element connected to and movable by movements of said control means, a second rocker element, means connecting said second element and driven member for communicating a predetermined rocking movement to one from a rotation of the other, a toggle link connection between said elements and operable to communicate rocking movements from one to the other thereof, whereby said control means is moved from operative to inoperative position during a predetermined portion of a rotation of said rotatable member, and means for initially breaking said link connection when said elements are in clutch releasing position, whereby a movement of the control means from inoperative to operative position effects a further breaking of said toggle connection.

9. In combination, rotatable drive and driven members, clutch controlled driving connection between said members, manually operable control means for the clutch of said connection, a bell-crank lever, a rocker-arm, connection between said rocker-arm and control means for moving one with the other, connection between said driven member and lever for imparting rocking movements to one from a rotation of the other, toggle link connection between said lever and arm operable to impart a clutch releasing movement to said arm and control means from a predetermined portion of the movement of said lever, means coacting with said toggle connection to permit it to break when said arm and control means have clutch engaging movements, and means carried by said toggle connection and operable to exert a straightening or breaking force thereon.

In testimony whereof, I have hereunto signed my name to this specification.

BROR J. LINDGREN.